United States Patent
Schweid

(10) Patent No.: US 8,089,670 B2
(45) Date of Patent: Jan. 3, 2012

(54) METHOD FOR UPSAMPLING COLOR CORRECTION TABLES, AN APPARATUS FOR CREATING AN UPSAMPLED COLOR CORRETION TABLE, AND A PROGRAM FOR UPSAMPLING COLOR CORRECTION TABLES

(75) Inventor: Stuart Alan Schweid, Pittsford, NY (US)

(73) Assignee: Xerox Corporation, Norwalk ( * ) Notice: Subject to any disclaimer, the term of this patent is extended or adjusted under 35 U.S.C. 154(b) by 908 days.

(21) Appl. No.: 11/961,425

(22) Filed: Dec. 20, 2007

(65) Prior Publication Data

US 2009/0161126 A1 Jun. 25, 2009

(51) Int. Cl.
*H04N 1/46* (2006.01)
(52) U.S. Cl. ....... 358/525; 358/1.9; 358/3.26; 358/3.27; 382/300
(58) Field of Classification Search ............ 358/1.9, 358/3.23, 518, 525; 382/300; 348/538
See application file for complete search history.

(56) References Cited

U.S. PATENT DOCUMENTS

| 5,293,539 | A | * | 3/1994 | Spence | 358/527 |
| 5,483,259 | A | * | 1/1996 | Sachs | 345/600 |
| 5,684,544 | A | * | 11/1997 | Astle | 348/708 |
| 6,205,246 | B1 | * | 3/2001 | Usami | 382/167 |
| 7,633,658 | B2 | * | 12/2009 | Tsuji | 358/518 |
| 2005/0270600 | A1 | * | 12/2005 | Ito et al. | 358/518 |

OTHER PUBLICATIONS

James M. Hyman, "Accurate Monotonicity Preserving Cubic Interpolation", Dec. 1983, SIAM, vol. 4, No. 4.*

* cited by examiner

*Primary Examiner* — King Poon
*Assistant Examiner* — Richard Zhu
(74) *Attorney, Agent, or Firm* — Oliff & Berridge, PLC

(57) ABSTRACT

A method of forming a multidimensional upsampled table, which includes a plurality of upsampled contents and a plurality of upsampled columns and a plurality of upsampled rows, includes reading a multidimensional unsampled table having a plurality of unsampled content values. The multidimensional unsampled table has a plurality of unsampled columns and a plurality of unsampled rows. The multidimensional unsampled table is monotonic in the plurality of unsampled columns and is monotonic in the plurality of unsampled rows. The method further includes performing a Piecewise Cubic Hermite Interpolating Polynomial (PCHIP) interpolation to upsample the multidimensional unsampled table and to create the multidimensional upsampled table, and storing the multidimensional upsampled table. The PCHIP interpolation is independent of an order of interpolation direction.

18 Claims, 3 Drawing Sheets

METHOD FOR UPSAMPLING COLOR CORRECTION TABLES, AN APPARATUS FOR CREATING AN UPSAMPLED COLOR CORRETION TABLE, AND A PROGRAM FOR UPSAMPLING COLOR CORRECTION TABLES

BACKGROUND

The embodiments generally relate to the upsampling of a multidimensional table, and in particular, to upsampling a color correction table using an interpolation method that ensures monotonicity in the primary directions of the resulting upsampled table.

Generally, in imaging devices, because there is a difference in the range of colors between the color space of a sample image and the color space within which the imaging device can reproduce an image, there is a need to adjust the color of the sample image to ensure that the color of the sample image and the color of the reproduced image are substantially equivalent. In other words, there is a mapping function which maps the colors of the sample image with corresponding points in the color space of the imaging device.

SUMMARY

However, various factors dictate the resolution of the imaging device color space. For example, imaging devices may include a look-up table (LUT) that provides specific values to which the sample image will be mapped. Of course, as the dimensions of the LUT are increased, the resolution of the imaging device color space is also increased. Further, various interpolations may be used to upsample the LUT. However, each interpolation method typically has problems associated with such a method. When determining the desired resolution of the imaging device color space, one must balance the costs and benefits associated with building a larger LUT and the varying interpolation methods.

Imaging correction generally uses a 3D or 4D LUT to convert from Lab to CMYK or from CMYK to CMYK. The numerical cost of building such a LUT is expensive. If the LUT is built using an image device model, the method of building the LUT requires an iterative procedure of an inverse mapping followed by smoothing. Additionally, if the imaging correction is mixed with Automatic Spot Color Emulation (ASCE), each node of the LUT must be individually adjusted, and the number of nodes becomes a paramount concern. Because of the high costs associated with building such a LUT, there is a preference to minimize the dimensions of the LUT.

Thus, it is desirable to create a low resolution table (i.e., a LUT) and to convert the low resolution table to a high resolution table using a sophisticated interpolation method. Printer or imaging correction may use a tetrahedral interpolation table for color correction. However, only the values at the table nodes can be defined in the correction. The values represented between table nodes are an outcome of the interpolation method. Unfortunately, tetrahedral interpolation cannot model curvature between node points. Therefore, in order for imaging correction to model curvature in the color space, one may utilize larger tables or one may upsample the lower resolution table with alternate interpolation methods (e.g., spline). Alternatively, one may decide that imaging correction with inherent interpolation errors is sufficient.

Several related interpolation methods exist that are common for such imaging correction purposes. The most common interpolation methods are cubic and cubic spline. Although cubic and cubic spline create an upsampled space or table that models curvature not otherwise available by using tetrahedral interpolation on the low resolution table, there are various problems associated with using cubic and cubic spline interpolations that make such interpolations undesirable. For example, spline and cubic spline interpolations introduce errors, such as oscillations among the upsampled space. In this regard, cubic and cubic spline are not monotonic preserving. Thus, sample points or table nodes which are monotonically increasing may be upsampled to functions that have inversions.

Mathematically speaking, if spline or cubic spline methods are used to upsample a space, the function representative of the upsampled space or upsampled nodes may be such that the function has a point wherein the first derivative is a negative value. For example a non-decreasing function representative of the unsampled space may be interpolated to create a function that decreases at one or more parts. Taken to an extreme, the interpolation could produce values outside of hard limits, the hard limits being unsampled space boundary points. For example, an upsampled tone reproduction curve (TRC) may contain values outside the range of 0 to 255.

For imaging purposes, it is beneficial to have a function representative of a color space that is non-decreasing. Specifically, it is highly undesirable to have a color space wherein the color space becomes a lighter shade in a direction where the color space is supposed to be gradually becoming a darker shade. Thus, cubic and cubic spline interpolations are not ideal interpolation methods for increasing TRC/3D LUT color table size.

An alternative to the aforementioned interpolation methods is the Piecewise Cubic Hermite Interpolating Polynomial (PCHIP). PCHIP is an excellent interpolation for monotonic and non-smooth data. However, PCHIP is only defined in one dimension. In other words, whereas spline and cubic spline are separable interpolations, PCHIP is not a separable interpolation. A separable interpolation is an interpolation that may be performed sequentially in each interpolation direction regardless of the order within which the directions are interpolated. Thus, because PCHIP is not a separable interpolation, a PCHIP interpolation is dependent on the order of direction in which the table (or LUT) is upsampled, and each permutation of PCHIP interpolation with respect to the order of interpolation direction is different. Because of this inherent property of PCHIP and because of the differing results based on the permutation of the PCHIP interpolation, the interpolating results are ambiguous, and thus, PCHIP is not commonly used.

To cure the deficiencies in the aforementioned interpolation methods, the embodiments use an interpolation method that maintains monotonicity in the interpolated space or color space. The unsampled color space may be interpolated by interpolating the primary directions of the color space using only those values corresponding to nodes of the unsampled color space to interpolate the space between two nodes. Further to this end, the embodiments may use an interpolation function that ensures monotonicity.

For example, an interpolation function may be represented as a PCHIP interpolation to upsample a color correction table. Indeed, embodiments extend PCHIP to multi-dimensions using particular properties of the tetrahedral interpolation. Attributes of tetrahedral interpolation fit PCHIP upsampling in ways that do not exist to trilinear interpolated tables. PCHIP upsampled tables more accurately represent a high resolution imaging correction and therefore, the PCHIP upsampled tables are more accurate for reproducing colors between the node points.

Embodiments couple a PCHIP interpolation method with tetrahedral interpolation methods to utilize the conventional PCHIP interpolation in an unique fashion. Each primary direction in tetrahedral interpolation only uses two points to interpolate. Conversely, other interpolation methods such as trilinear may use greater than two points to perform interpolation. For trilinear interpolation, the interpolated value placed equidistant from 8 known node points will be the average of the 8 nodes. However, tetrahedral interpolation will equal the average of only those two particular nodes—the node at the lower left of the value to be interpolated and the node in the upper right back of it. This separation of direction—only needing 2 points or nodes at a time; and not all neighboring points or nodes—allows PCHIP to be applied in the direction of those two points or nodes, but with additional neighbors in those directions, to figure out the center of the cube of a tetrahedral table.

Embodiments may apply the coupling of the PCHIP interpolation and tetrahedral interpolation to upsample a 3 dimensional space or LUT. For such an embodiment, a 3 dimensional LUT includes 7 primary directions used by tetrahedral interpolation: right, up, back, right-up, right-back, up-back, right-up-back. Applying the primary directions to a Cartesian plane: right represents the x-axis; up represents the y-axis; and back represents the z-axis. The primary directions are the only directions from a point or node that require only two points or nodes to perform the interpolation. As a result, embodiments apply PCHIP 7 times to a low resolution table or LUT—once in each primary tetrahedral direction—to create a higher resolution table or LUT.

An embodiment applying 7 PCHIP interpolations to a low resolution table or LUT to calculate values halfway between nodes or points, will double the table size or the LUT size (e.g., from 17×17×17 to 33×33×33). Embodiments results are independent of the order that the 7 PCHIP interpolations are applied. Thus, embodiments employing such an interpolation method are effective for multidimensional interpolation.

For example, to achieve embodiments, an interpolation function is represented as a PCHIP interpolation to upsample a color correction table.

Embodiments may be used to upsample unsampled tables or LUTs by a power of two. For example, embodiments may upsample a 17×17×17 table or LUT to create a 33×33×33 table or LUT. Alternatively, embodiments may be used to upsample unsampled tables or LUTs by a power greater than two.

Embodiments may include an image device further comprising an unsampled table or LUT or a low resolution table or LUT. Embodiments may include a second storage unit for storing the unsampled table or LUT; embodiments may include a display unit for displaying an upsampled table or LUT; embodiments may include a first storage unit for storing an upsampled table or LUT; and embodiments may include a processing unit or a computer that performs an interpolation method that ensures monotonicity.

Embodiments may include a program stored on a computer readable storage medium, wherein the program executes an interpolation method that ensures monotonicity and that upsamples an unsampled table or LUT.

The PCHIP upsampling method has been applied to a downsampled color correction LUT to try to estimate the original high resolution color correction. This result was compared to the upsampled color correction that resulted from using tetrahedral interpolation as the upsampling method. A mean square error (MSE) for each method was computed; the PCHIP upsampled table error was at least 15% lower than the tetrahedral upsampled error.

Initial results suggest that a PCHIP upsampled color correction is closer in performance to a high resolution table than one that does not use up sampling.

EMBODIMENTS

Figure 1:
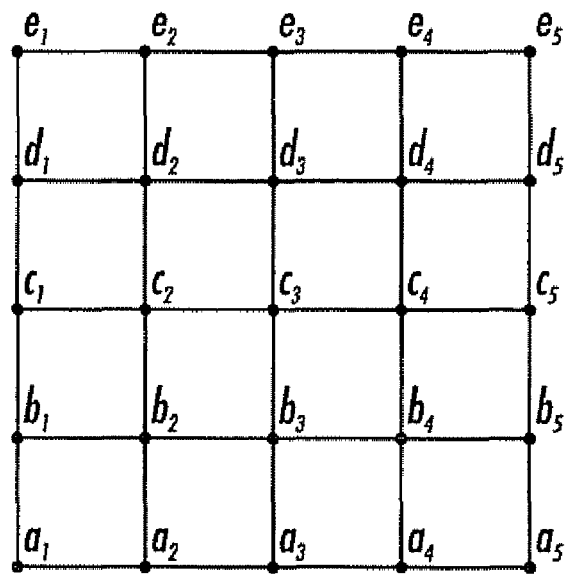
FIG. 1 illustrates a two-dimensional 5×5 table or LUT in an exemplary embodiment.

FIG. 1 illustrates a typical two dimensional table or LUT 1. As shown in FIG. 1, the LUT 1 includes 5 rows and 5 columns. Each row has 5 nodes corresponding to the intersection of a row with a column. Further, each row shares a node with each column. As depicted in FIG. 1, the nodes of the first row are labeled a1, a2, a3, a4 and a5; the nodes of the second row are labeled b1, b2, b3, b4 and b5; the nodes of the third row are labeled c1, c2, c3, c4 and c5; the nodes of the fourth row are labeled d1, d2, d3, d4 and d5; and the nodes of the fifth row are labeled e1, e2, e3, e4 and e5. FIG. 1 merely represents a two dimensional LUT 1. Embodiments may expand the dimensions of the LUT 1 such that there are n rows and m columns, wherein n and m are both positive integers. Moreover, an exemplary embodiment may expand the number of dimensions of the LUT 1 to any positive integer. Indeed, other embodiments may include three dimensions or four dimensions.

It is noted that during each step of the interpolation method, only those values corresponding to the values originally provided in the LUT 1 are used to interpolate estimated values between the nodes. Otherwise, if estimated or interpolated values were used in subsequent steps in the interpolation method, the interpolation method may not be separable interpolations. In other words, the interpolation method would be dependent on the order of direction in which interpolation is performed.

Pursuant to embodiments, upsampling of the LUT 1 will be carried out by performing interpolation between neighboring nodes in each primary tetrahedral direction. The interpolation function is chosen to ensure monotonicity of the color space represented by LUT 1. Embodiments may utilize the PCHIP interpolation method to upsample the LUT 1. In this regard, PCHIP interpolation is carried out between neighboring nodes in the primary tetrahedral direction.

Figure 2:
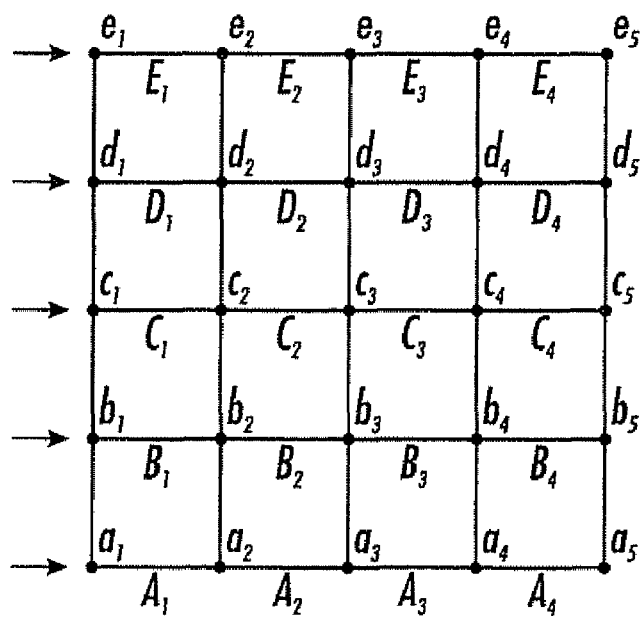
FIG. 2 illustrates a first step for upsampling the 5×5 LUT.

FIG. 2 illustrates the first step in upsampling the LUT 1. To accomplish the upsampling, the interpolation method uses two sequential nodes in the primary direction to interpolate a value between the sequential nodes. For example, to determine the interpolated values, nodes a1 and a2 are used to interpolate value A1; nodes a2 and a3 are used to interpolate value A2; nodes a3 and a4 are used to interpolate value A3; and nodes a4 and a5 are used to interpolate value A5. After the first row is upsampled, the interpolation method sequentially upsamples the remaining rows—in this example, the method sequentially upsamples rows B, C, D and E as described with respect to row A.

Figure 3:
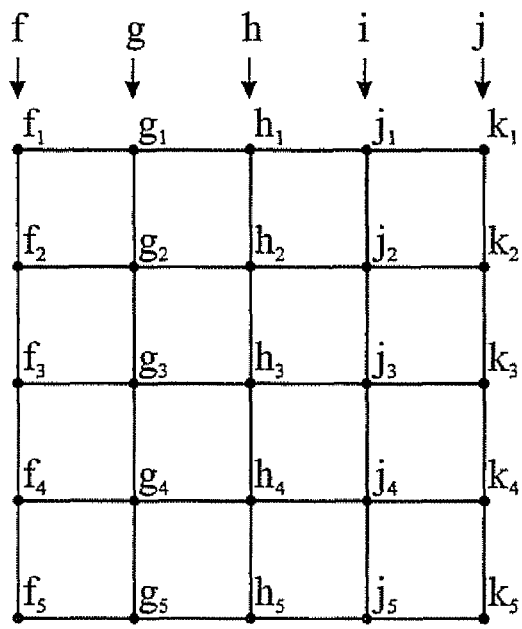
FIG. 3 illustrates a second step for upsampling the 5×5 LUT.

FIG. 3 illustrates the second step in upsampling the two dimensional LUT 1. Once all the rows are upsampled in the first step, the interpolation begins upsampling the columns using the nodes indicated in the embodiment of FIG. 3. As depicted in FIG. 3, the nodes of the first column are labeled f1, f2, f3, f4 and f5; the nodes of the second column are labeled g1, g2, g3, g4 and g5; the nodes of the third column are labeled h1, h2, h3, h4 and h5; the nodes of the fourth row are labeled j1, j2, j3, j4 and j5; and the nodes of the fifth column are labeled k1, k2, k3, k4 and k5. The interpolation method upsamples the columns sequentially. For example, to determine the interpolated values, nodes f1 and f2 are used to interpolate F1; nodes f2 and f3 are used to interpolate F2; nodes f3 and f4 are used to interpolate F3; and nodes f4 and f5 are used to interpolate F5. After the first column is upsampled, the interpolation method sequentially upsamples the columns—in this example, the method sequentially upsamples columns F, G, H, J and K, as described with respect to column F. Specifically, only two neighboring nodes are utilized to interpolate each value between the neighboring nodes.

Finally, to complete interpolation of the two dimensional LUT 1, the interpolation method interpolates values found on the diagonals of the LUT 1. As discussed above, the interpolation method upsamples the LUT 1 or table using only preferred or primary directions as determined by tetrahedral interpolation. Because the interpolation method utilizes properties of the tetrahedral interpolation, it is essential that the interpolation only interpolate along only those directions defined as preferred or primary directions by tetrahedral interpolation.

Figure 4:
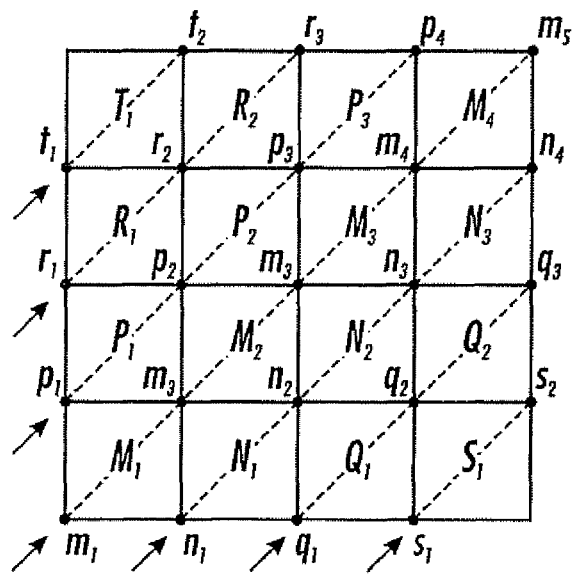
FIG. 4 illustrates a third step for upsampling the 5×5 LUT.

FIG. 4 illustrates the third step of upsampling a two-dimensional LUT 1. As depicted in FIG. 4, the interpolation method interpolates those diagonals along a positive 45 degree angle with the rows A through E of FIG. 1. FIG. 4 illustrates the nodes of the first diagonal as s1 and s2; the nodes of the second diagonal are labeled q1, q2 and q3; the nodes of the third diagonal are labeled n1, n2, n3 and n4; the nodes of the fourth diagonal are labeled m1, m2, m3, m4 and m5; and the nodes of the fifth diagonal are labeled p1, p2, p3 and p4; the nodes of the sixth diagonal are labeled r1, r2 and r3; the nodes of the seventh diagonal are labeled t1 and t2. The interpolation method upsamples the diagonals sequentially. For example, to determine the interpolated values, nodes s1 and s2 are used to interpolate S1. Next, nodes q1 and q2 are used to interpolate Q1, and nodes q2 and q3 are used to interpolate Q2. After the first diagonal is upsampled, the interpolation method sequentially upsamples the diagonals—in this example, the method sequentially upsamples diagonals S, Q, N, M, P, R and T, as described with respect to diagonal S.

It is noted that the interpolation method interpolates only those diagonals along a positive 45 degree angle with the rows A through E of FIG. 1. The diagonals along a positive 45 degree angle with the rows of the table is defined as a primary direction by tetrahedral interpolation. Conversely, tetrahedral interpolation does not define the diagonals along a negative 45 degree angle with the rows as being primary directions.

Figure 5:
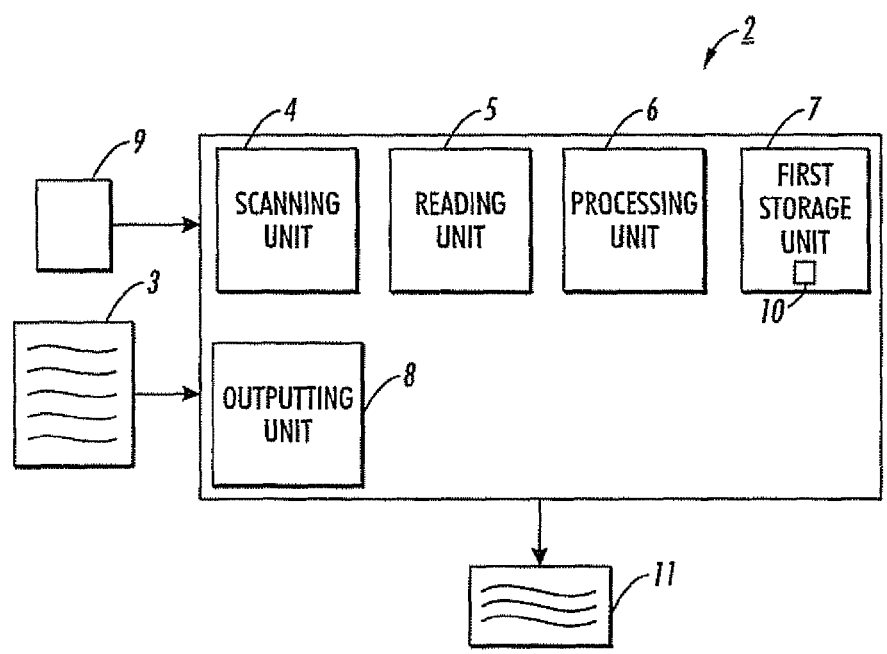
FIG. 5 illustrates a block diagram of an exemplary imaging device.

FIG. 5 illustrates an imaging apparatus 2 comprising at least a scanning unit 4, a reading unit 5, a processing unit 6, a first storage unit 7 and an outputting unit 8.

The imaging apparatus 2 has a scanning unit 4. The scanning unit 4 scans, reads or otherwise interfaces with the input of an image or document 3. The scanning unit 4 may convert the image or document 3 from a physical object to digital format for digital processing. Alternatively, the scanning unit 4 may read an image or document 3 that is already stored in a digital format, regardless of whether the image or document 3 in a digital format is temporarily or permanently stored.

The imaging apparatus 2 also has a reading unit 5 that reads a multidimensional unsampled table 9. The reading unit S may interface with storage devices or I/O devices to read the multidimensional unsampled table 9. Once the reading unit 5 has read the multidimensional unsampled table 9, the reading unit 5 provides the multidimensional unsampled table 9 to the processing unit 6.

The processing unit 6 performs an upsampling algorithm on the multidimensional table 9 to create a multidimensional upsampled table 10. The upsampling algorithm ensures that the multidimensional table 10 is monotonic in each its columns and in each of its rows. The processing unit may perform the upsampling algorithm using software programs or by using hardware logic devices. The processing unit 6 may create the multidimensional upsampled table 10 within about a fraction of a second. The processing unit 6 may perform the upsampling algorithm to create a multidimensional upsampled table 10 each time the imaging apparatus 2 is powered on, or alternatively, the processing unit 6 may create a multidimensional upsampled table 10 each time the scanning unit 4 scans, reads or otherwise interfaces with the input of an image or document 3. Further still, the processing unit 6 may create a multidimensional upsampled table 10 as the scanning unit 4 scans, reads or otherwise interfaces with the input of a portion of the image or document 3. For example, if the image or document 3 includes a plurality of pages, the processing unit 6 may create a multidimensional upsampled table 10 as the scanning unit 4 scans, reads or otherwise interfaces with the input of at least one of the plurality of pages of the image or document 3.

After the processing unit 6 creates the multidimensional upsampled table 10, the processing unit 6 interfaces with a first storage unit 7 for storing of the multidimensional upsampled table 10. The first storage unit 7 may permanently or temporarily store the multidimensional upsampled table 10. Typically, the first storage unit 7 stores the multidimensional upsampled 10 table until the next time the processing unit 6 creates a multidimensional upsampled table.

Upon storage of the multidimensional upsampled table 10 the multidimensional upsampled table is used for the specific purpose that the imaging device 2 is directed to. For example, if the imaging device 2 is a photocopier, the photocopier uses the multidimensional upsampled table to help specify the amount of color or toner to apply to the output image or document 11. Thus, the imaging device includes the outputting unit 8. The outputting unit 8 outputs an output image or document 11 that substantially corresponds to the image or document 3.

The imaging apparatus 2 may further include an imaging unit that creates the output image or document 11. Further, the imaging apparatus 2 may include an input unit that allows a user to control the resolution of the multidimensional upsampled table. In other words, an input unit may be used to allow a user to control how large a multidimensional upsampled table the processing unit 6 creates.

It will be appreciated that various of the above-disclosed and other features and functions, or alternatives thereof, may be desirably combined into many other different methods, systems or applications. Also, various presently unforeseen or unanticipated alternatives, modifications, variations or improvements therein may be subsequently made by those skilled in the art which are also intended to be encompassed by the following claims.

What is claimed is:

1. A method of forming a multidimensional upsampled table comprising a plurality of upsampled contents, a plurality of upsampled columns, and a plurality of upsampled rows, the method comprising:

(A) reading a multidimensional unsampled table including a plurality of unsampled content values, the multidimensional unsampled table having a plurality of unsampled columns and a plurality of unsampled rows, the multidimensional unsampled table being monotonic in each of the plurality of unsampled columns and being monotonic in each of the plurality of unsampled rows;

(B) performing an upsampling algorithm on the plurality of unsampled content values of the multidimensional unsampled table to create the multidimensional upsampled table, wherein:

(a) the multidimensional unsampled table includes a plurality of nodes corresponding to the plurality of unsampled content values that correspond to the intersections of unsampled rows and unsampled columns of the multidimensional unsampled table and a plurality of unsampled boundary nodes corresponding to the plurality of unsampled content values at an end-point of each of at least one of the plurality of unsampled rows of the multidimensional unsampled table or at an end-point of each of the at least one of the plurality of unsampled columns of the multidimensional unsampled table;

(b) the multidimensional unsampled table includes at least one of:

(i) an increasing column direction corresponding to the direction in which the plurality of unsampled content values in the at least one unsampled column increases in value, wherein the at least one unsampled column has a greater column node corresponding to the unsampled boundary having the greater unsampled content value, and a lower column node corresponding to the unsampled boundary node having the lower unsampled content value; and (ii) an increasing unsampled row direction corresponding to the direction in which the plurality of unsampled content values in the at least one unsampled row increases in value, wherein the at least one unsampled row has a greater row node corresponding to the unsampled boundary node having the greater unsampled content value, and a lower row node corresponding to the unsampled boundary node having the lower unsampled content value;

(c) based on the properties of the upsampling algorithm, the multidimensional upsampled table has at least one of the following properties:

(i) no upsampled content value in a given upsampled column of the multidimensional upsampled table being greater than the greater column node in the corresponding unsampled column of the multidimensional unsampled table;

(ii) no upsampled content value in a given upsampled column of the multidimensional upsampled table being less than the lower column node in the corresponding unsampled column of the multidimensional unsampled table;

(iii) no upsampled content value in a given upsampled row of the upsampled table being greater than the greater row node in the corresponding unsampled row of the multidimensional unsampled table; and (iv) no upsampled content value in a given upsampled row of the multidimensional upsampled table being less than the lower row node in the corresponding unsampled row of the multidimensional unsampled table; and (C) at least one of storing the multidimensional upsampled table, outputting the upsampled table and displaying the upsampled table; wherein the performing of the upsampling algorithm includes interpolating a plurality of values, each value being based on a pair of sequential unsampled nodes in a primary direction as determined by tetrahedral interpolation, wherein values are interpolated in each of the primary directions as determined by tetrahedral interpolation and the interpolation of each value is based on only the pair of sequential unsampled nodes;

the upsampling algorithm is a Piecewise Cubic Hermite Interpolating Polynomial (PCHIP) interpolation;

each pair of nodes includes an original value of each node before being interpolated; and each of the above steps is performed by a processor.

2. The method of claim 1, wherein:
the multidimensional unsampled table is embedded in one of a document or an image.

3. The method of claim 1, wherein:
the unsampled table is monotonic; and
based on the properties of the upsampling algorithm, the upsampled table is monotonic.

4. The method of claim 1, wherein:
the range of the upsampled content values is identical to the range of the unsampled content values.

5. The method of claim 3, wherein:
the upsampling algorithm is independent of an order of interpolation direction.

6. The method of claim 1, wherein:
the upsampling algorithm upsamples the multidimensional unsampled table by an order of at least two.

7. The method of claim 1, wherein:
the multidimensional upsampled table is monotonic throughout each of the plurality of upsampled columns and is monotonic throughout each of the plurality of upsampled rows.

8. The method of claim 1, wherein:
the multidimensional upsampled table has dimensions of 33×33×33.

9. The method of claim 1, further comprising:
upsampling color space with the multidimensional unsampled table and the multidimensional upsampled table, the unsampled table defining an unsampled color space and the upsampled table defining an upsampled color space, the upsampled color space having greater resolution than the unsampled color space.

10. The method of claim 1, further comprising:
interpolating between two unsampled content values to establish a content value in the multidimensional upsampled table.

11. The method of claim 1, the PCHIP interpolation being independent of an order of interpolation direction.

12. An executable program stored on a non-transitory computer readable storage medium, the program performing functions, the program performing the following functions:

reading a multidimensional unsampled table including a plurality of unsampled content values, the multidimensional unsampled table having a plurality of unsampled columns and a plurality of unsampled rows, the multidimensional unsampled table being monotonic in each of the plurality of unsampled columns and being monotonic in each of the plurality of unsampled rows, the multidimensional unsampled table including a plurality of nodes corresponding to the plurality of unsampled content values that correspond to the intersections of unsampled rows and unsampled columns of the multidimensional unsampled table;

performing an upsampling algorithm on the plurality of unsampled content values of the multidimensional unsampled table to create a multidimensional upsampled table, the multidimensional upsampled table being monotonic in each of the plurality of upsampled columns and being monotonic in each of the plurality of upsampled rows; and at least one of storing the multidimensional upsampled table, outputting the upsampled table and displaying the upsampled table, wherein the upsampling algorithm includes interpolating a plurality of values, each value being based on a pair of sequential unsampled nodes in a primary direction as determined by tetrahedral interpolation, wherein values are interpolated in each of the primary directions as determined by tetrahedral interpolation and the interpolation of each value is based on only the pair of sequential unsampled nodes, and is a Piecewise Cubic Hermite Interpolating Polynomial (PCHIP) interpolation; and each pair of nodes includes an original value of each node before being interpolated.

13. The executable program stored on the non-transitory computer readable storage medium of claim 12, wherein:

the upsampling algorithm is independent of an order of interpolation direction.

14. The executable program stored on the non-transitory computer readable storage medium of claim 12, wherein:

the range of the upsampled content values is identical to the range of the unsampled content values.

15. An apparatus for upsampling a color correction table, comprising:

a reading unit for reading a multidimensional unsampled table including a plurality of unsampled content values, the multidimensional unsampled table having a plurality of unsampled columns and a plurality of unsampled rows, the multidimensional unsampled table being monotonic in each of the plurality of unsampled columns and being monotonic in each of the plurality of unsampled rows, the multidimensional unsampled table including a plurality of nodes corresponding to the plurality of unsampled content values that correspond to the intersections of unsampled rows and unsampled columns of the multidimensional unsampled table;

a processing unit for performing an upsampling algorithm on the plurality of unsampled content values of the multidimensional unsampled table to create a multidimensional upsampled table, the multidimensional upsampled table being monotonic in each of the plurality of upsampled columns and being monotonic in each of the plurality of upsampled rows; and a first storage unit for storing the multidimensional upsampled table, wherein:

the processing unit interpolates a plurality of values, each value being based on a pair of sequential unsampled nodes in a primary direction as determined by tetrahedral interpolation, wherein values are interpolated in each of the primary directions as determined by tetrahedral interpolation and the interpolation of each value is based on only the pair of sequential unsampled nodes;

the upsampling algorithm is a Piecewise Cubic Hermite Interpolating Polynomial (PCHIP) interpolation; and each pair of nodes includes an original value of each node before being interpolated.

16. The apparatus of claim 15, wherein:

the processing unit upsamples the multidimensional unsampled table using at least one of hardware logic devices and an executable program stored on a computer readable storage medium.

17. The apparatus of claim 16, wherein:

the upsampling algorithm being independent of an order of interpolation direction.

18. The apparatus of claim 17, further comprising at least one of:

a scanning unit to scan at least one of an input image or an input document; and a outputting unit to output at least one of an output image or an output document.

* * * * *